(12) United States Patent
Du et al.

(10) Patent No.: US 10,456,728 B2
(45) Date of Patent: Oct. 29, 2019

(54) PROCESS FOR RECOVERING VALUABLES FROM VENT GAS IN POLYOLEFIN PRODUCTION

(71) Applicant: Dalian Eurofilm Industrial Ltd., Dalian, Liaoning (CN)

(72) Inventors: Guodong Du, Liaoning (CN); Yanxun Ma, Liaoning (CN); Xiaobo Zhou, Liaoning (CN); Chonglong Bao, Liaoning (CN)

(73) Assignee: Dalian Eurofilm Industrial Ltd., Dalian, Liaoning (CN)

( * ) Notice: Subject to any disclaimer, the term of this patent is extended or adjusted under 35 U.S.C. 154(b) by 78 days.

(21) Appl. No.: 15/739,462

(22) PCT Filed: Jan. 4, 2017

(86) PCT No.: PCT/CN2017/070132
§ 371 (c)(1),
(2) Date: Dec. 22, 2017

(87) PCT Pub. No.: WO2018/107553
PCT Pub. Date: Jun. 21, 2018

(65) Prior Publication Data
US 2018/0361305 A1  Dec. 20, 2018

(51) Int. Cl.
*B01D 53/22* (2006.01)
*B01D 53/00* (2006.01)
(Continued)

(52) U.S. Cl.
CPC ......... *B01D 53/002* (2013.01); *B01D 53/047* (2013.01); *B01D 53/22* (2013.01);
(Continued)

(58) Field of Classification Search
CPC ............ B01D 53/229; B01D 2257/702; B01D 53/22; B01D 53/002; B01D 53/047; B01D 53/265; B01D 2256/10; B01D 53/26
See application file for complete search history.

(56) References Cited

U.S. PATENT DOCUMENTS 2,002,940 A * 5/1935 Frankl ................ F25J 5/00
62/645
2,062,537 A * 12/1936 Twomey ............. F25J 3/08
368/288
(Continued)

FOREIGN PATENT DOCUMENTS

CN     103520946 A     1/2014
CN     104792117 A     7/2015
(Continued)

OTHER PUBLICATIONS

International Search Report for corresponding PCT Application No. PCT/CN2017/070132.

*Primary Examiner* — Anthony R Shumate
(74) *Attorney, Agent, or Firm* — Wood, Phillips, Katz, Clark & Mortimer (57) ABSTRACT

A process for recovering valuables from vent gas in polyolefin production is disclosed. The process includes a compression cooling separation step, a heavy hydrocarbon separation step, a light hydrocarbon separation step, a $N_2$ purification step, and a turbo expansion step in sequence. The $N_2$ purification step comprises a membrane separation procedure. The light hydrocarbon separation step comprises at least one gas-liquid separation procedure. A first gas, which is obtained by the gas-liquid separation procedure and is heated through heat exchange with multiple streams in the light hydrocarbon separation step, enters the heavy hydrocarbon separation step and is further heated; the heated first gas then enters the $N_2$ purification step; a first generated gas, which is obtained by the membrane separation procedure of the $N_2$ purification step, enters the heavy hydrocarbon separation step and the light hydrocarbon separation step in sequence, and is cooled through heat exchange with multiple streams in the heavy hydrocarbon separation step and the (Continued)

light hydrocarbon separation step; and then the cooled first generated gas enters the turbo expansion step. The energy consumption of a compressor can be greatly reduced. An external cooling medium with a temperature lower than an ambient temperature is not needed. The purity and recovery of $N_2$ and hydrocarbons can be improved, which can facilitate reduction of energy consumption of a whole system, an investment, and a material consumption.

10 Claims, 3 Drawing Sheets

(51) Int. Cl.
  *B01D 53/047* (2006.01)
  *B01D 53/26* (2006.01)
(52) U.S. Cl.
  CPC ........... *B01D 53/229* (2013.01); *B01D 53/26* (2013.01); *B01D 53/265* (2013.01); *B01D 2256/10* (2013.01); *B01D 2257/702* (2013.01)

(56) References Cited

U.S. PATENT DOCUMENTS

| | | | | |
|---|---|---|---|---|
| 2,143,283 | A * | 1/1939 | Schmidt | C01B 32/50 423/351 |
| 3,358,460 | A * | 12/1967 | Smith | F25J 1/0015 62/649 |
| 3,616,652 | A * | 11/1971 | Engel | F25J 1/0022 62/613 |
| 3,968,649 | A * | 7/1976 | Edwards | F01N 3/02 60/297 |
| 4,883,518 | A * | 11/1989 | Skolaude | F25J 3/042 62/646 |
| 2003/0175626 | A1* | 9/2003 | Ryza | B08B 7/0021 430/329 |
| 2008/0039597 | A1 | 2/2008 | Vuorikari et al. | |
| 2011/0113825 | A1* | 5/2011 | Neeraas | F25J 1/0022 62/613 |
| 2014/0109598 | A1* | 4/2014 | Kim | F25B 9/14 62/6 |
| 2014/0245780 | A1* | 9/2014 | Wyllie | F25J 1/0022 62/613 |
| 2015/0040848 | A1* | 2/2015 | McAlister | F02M 21/0206 123/1 A |
| 2016/0268874 | A1* | 9/2016 | Inoue | H02K 9/20 |

FOREIGN PATENT DOCUMENTS

| | | |
|---|---|---|
| CN | 104923029 A | 9/2015 |
| CN | 105509413 A | 4/2016 |
| CN | 206276186 U | 6/2017 |

* cited by examiner

PROCESS FOR RECOVERING VALUABLES FROM VENT GAS IN POLYOLEFIN PRODUCTION

CROSS REFERENCE TO RELATED APPLICATIONS

The present application claims the priority of Chinese patent application CN201611144702.2, entitled "Process for recovering valuables from vent gas in polyolefin production" and filed on Dec. 13, 2016, the entirety of which is incorporated herein by reference.

FIELD OF THE INVENTION

The present disclosure relates to chemical industry and petrochemical industry, and particularly to a process for recovering valuables from vent gas in polyolefin production.

BACKGROUND OF THE INVENTION

During polyolefin production process, gas (which is generally called as vent gas) generated from reactor, flash tank, degassing column and other devices contains large amounts of inert gases (such as $N_2$ and saturated hydrocarbons), unreacted olefin monomer, and other kinds of gas, in which hydrocarbons have a very high economic value, and $N_2$ can be recovered and reused after being purified (for example, $N_2$ can serve as a purge gas of a degassing column). In traditional technology, the vent gas is generally recovered by a compression-condensation method. Since different components have different boiling points, through reducing a temperature of the vent gas, some gas can be liquefied and separated. However, if a high recovery is required, energy consumption and an investment of the compression-condensation method will become relatively high, which cannot meet the improved requirement. Therefore, other methods with a higher separation factor and a higher efficiency are developed, such as a membrane separation method and a pressure swing adsorption method (US patents U.S. Pat. No. 6,706,857 and U.S. Pat. No. 5,769,927). These methods should be used in combination with the compression-condensation method, because the product obtained after separation is in vapor-phase, and purity and pressure thereof cannot meet the requirement of direct reuse. In addition, people have made improvements on the method in which liquefaction is realized through temperature reduction, and the most prominent improvement is the realization of cryogenic technology through turbo expansion or throttle expansion (CN201310444283). Moreover, it is discovered that, different combinations of these methods can bring about different effects. That is, from the aspect of separation engineering, the design of separation sequence is very important. Different separation sequences can lead to rather different recoveries, product purities, energy consumptions, and investments. It is regrettable that, in the prior art, different separation technologies are only simply combined, while the optimized separation sequence is not developed, which leads to various problems.

Chinese patent CN200910038599.7 discloses a method for completely recovering vent gas in polyethylene plant, and a separation sequence of this method is compression-condensation separation, hydrocarbon selective membrane separation, and pressure swing adsorption separation. However, in this method, heavy hydrocarbons and light hydrocarbons cannot be separated, and the hydrocarbons obtained therein have a low concentration; $N_2$ and $H_2$ cannot be separated, and thus when a concentration of $H_2$ is relatively high, $N_2$ cannot be reused as a purge gas of a degassing column; and off-gas after pressure swing adsorption separation still has a relatively high pressure, which cannot be effectively utilized, and thus the energy consumption of the method is relatively high.

Chinese patent CN201310444283 discloses a system and a method for recovering emissions generated from an olefin polymerization process. According to this method, the separation sequence is compression-condensation separation, hydrogen selective membrane separation, and cryogenic separation. The patent mentioned that $H_2$ is separated from the vent gas by a hydrogen selective membrane to improve a purity of $N_2$, so that $N_2$ can be recycled and reused as a purge gas of a degassing column. Since the membrane separation step is arranged before the cryogenic separation step, when $H_2$ permeates the membrane, a large amount of hydrocarbon components permeate the membrane at the same time. Consequently, recovery of hydrocarbons is reduced. Moreover, the following cryogenic separation step is essentially one gas-liquid equilibrium separation step. Due to the limitation of an equilibrium separation temperature, the $N_2$ which is separated from a top of a separator still contains a small amount of hydrocarbon which cannot be treated, and thus a purity of $N_2$ obtained therein is not high.

US patent U.S. Pat. No. 5,769,927 discloses a monomer recovery process, and a separation sequence of this process is compression-condensation separation and membrane separation. Due to operating limit of a hydrocarbon selective membrane module, a condensation temperature of this process is relatively high (about −30° C.). Some heavy hydrocarbons can be separated through condensation separation, but a large amount of light hydrocarbons need to be separated by the following membrane separation step. According to this process, the light hydrocarbons, which are separated by the membrane, are all returned to a compressor, and the only outlet of hydrocarbons is arranged at a separator in the compression-condensation separation step. This separation sequence will result in a large gas circulation amount returning to the compressor after the membrane separation step. Moreover, the content of hydrocarbons in the gas needs to be accumulated to a high level before the compression-condensation separation step, the hydrocarbons in the original feed stream can be completely condensed here. Consequently, energy consumption of the compressor is significantly increased. In addition, heavy hydrocarbons and light hydrocarbons are not separated by this process, and thus cannot be reused respectively. $N_2$ and $H_2$ are not separated either, and thus $N_2$ is not suitable to serve as a purge gas of a degassing column, since the accumulation of $H_2$ will bring about safety risk to the operation of the degassing column.

Chinese patent CN201510294040.6 discloses a method for recovering vent gas according to gas phase process polyolefin method, and a separation sequence of the method is compression-condensation separation, ordinary cryogenic separation, hydrocarbon selective membrane separation, hydrogen selective membrane separation, and cryogenic separation. In this method, a hydrocarbon selective membrane separation step is added. However, with this separation sequence design, a high amount of hydrocarbons need to be treated by hydrocarbon selective membrane. After the ordinary cryogenic separation step, the gas still contains a large amount of hydrocarbons. A large amount of gas is returned to the compressor after the hydrocarbon selective membrane separation, and energy consumption of the compressor is rather high. In addition, after the hydrocarbon selective membrane separation and the hydrogen selective membrane separation, the gas enters the cryogenic separation step, and $N_2$ with a high purity can be obtained only at a lower separation temperature due to the limitation of the equilibrium temperature. As a result, the equipment investment and operating energy consumption of the cryogenic separation step in this method are higher than the cryogenic separation step in the aforesaid patents. Moreover, the patent points out that, in the ordinary cryogenic separation step, when a concentration of hydrocarbons in the vent gas is not high, an external refrigerant should be added. It is regrettable that, the concentration of hydrocarbons in the vent gas of polyolefin production is generally low, and thus a low-temperature external refrigerant needs to be added. Due to the limitation of an operating temperature of membrane module, the temperature of the ordinary cryogenic separation step cannot be arranged too low, and the recovery of hydrocarbons in the ordinary cryogenic separation step is not high. Therefore, the main role of the following hydrocarbon selective membrane separation step is separating hydrocarbons rather than purifying $N_2$. Although the hydrogen selective membrane separation step is arranged later, there will be a certain amount of hydrocarbons permeating through the membrane together with $H_2$ since hydrocarbons are not completely separated in the hydrocarbon selective membrane separation step, which will result in the loss of hydrocarbons.

US patent U.S. Pat. No. 6,706,857 discloses a method for recovery of olefin monomers, and the separation sequence of the method is cryogenic separation and pressure swing adsorption separation. According to this method, the pressure swing adsorption separation is used in the vent gas of the polyolefin production recovering field, and the adsorbent is defined. However, in the cryogenic separation step, an additional external refrigerant is used, which is energy consuming and is not economical. According to the description of the patent, the pressure swing adsorption separation step mainly plays the role of separating hydrocarbons. As a result, the amount of gas which is returned to the compressor is rather large, and energy consumption of the compressor will be increased. In the examples of the patent, the vent gas does not contain heavy hydrocarbon. However, actually, the vent gas of polyolefin production process (includes polyethylene production and polypropylene production) mostly comprises heavy hydrocarbon components at present. Therefore, according to this method, heavy hydrocarbons and light hydrocarbons cannot be separated. In addition, $H_2$ and $N_2$ cannot be separated either, and $N_2$ with a high purity cannot be obtained.

US patent U.S. Pat. No. 574,350 discloses a method for recovering hydrocarbons from vent gas in polyolefin plant, and the separation sequence of this method is compression-condensation separation, oil absorption separation, and cryogenic separation. The oil absorption separation step is essentially a gas-liquid equilibrium separation step. Therefore, only high efficient absorbent is used, can the hydrocarbons in the vent gas be effectively absorbed. The high efficient absorbent should have two features, first, it has a good absorption effect on hydrocarbons, and second, the absorbent is a nonvolatile substance itself. However, in the patent, this kind of absorbent is not provided, while a heavy hydrocarbon and the like is used as the absorbent. Therefore, the oil absorption effect is unsatisfactory. During the cryogenic separation step, similar to the aforesaid patent CN201310444283, the $N_2$-rich gas from a top of a separator still contains a small amount of hydrocarbon which cannot be further treated, and thus a purity of $N_2$ obtained therein is not high. In addition, according to this method, the $H_2$ in the $N_2$-rich gas is not separated.

In view of the technical problem in the prior art, the present disclosure provides a process for recovering valuables from vent gas in polyolefin production.

SUMMARY OF THE INVENTION

The present disclosure provides a process for recovering valuables from vent gas in polyolefin production, whereby energy consumption of a compressor can be reduced, and purity and recovery of $N_2$ and hydrocarbons can be improved, which can facilitate reduction of energy consumption of a whole system, an investment, and a material consumption thereof.

In order to achieve the aforesaid purpose, the present disclosure provides a process for recovering valuables from vent gas in polyolefin production. The process comprises a compression cooling separation step, a heavy hydrocarbon separation step, a light hydrocarbon separation step, a $N_2$ purification step, and a turbo expansion step in sequence. The $N_2$ purification step comprises a membrane separation procedure. The light hydrocarbon separation step comprises at least one gas-liquid separation procedure. A first gas, which is obtained by the gas-liquid separation procedure and is heated through heat exchange with multiple streams in the light hydrocarbon separation step, enters the heavy hydrocarbon separation step and is further heated. The heated first gas then enters the $N_2$ purification step. A first generated gas, which is obtained by the membrane separation procedure of the $N_2$ purification step, enters the heavy hydrocarbon separation step and the light hydrocarbon separation step in sequence, and is cooled through heat exchange with multiple streams in the heavy hydrocarbon separation step and the light hydrocarbon separation step. Then, the cooled first generated gas enters the turbo expansion step.

According to the aforesaid process for recovering valuables from vent gas in polyolefin production, an external cooling medium is used for cooling in at least one of the compression cooling separation step, the heavy hydrocarbon separation step, the light hydrocarbon separation step, the $N_2$ purification step, and the turbo expansion step. A temperature of the external cooling medium is higher than or equal to an ambient temperature.

According to the aforesaid process for recovering valuables from vent gas in polyolefin production, in the compression cooling separation step, a vent gas and a recycle stream enter into a compressor to be compressed, and enter into a cooler, a cooling medium of which is cooling water or air.

According to the aforesaid process for recovering valuables from vent gas in polyolefin production, in the heavy hydrocarbon separation step, a first vent gas, which is generated by the compression cooling separation step, enters into a first multi-stream heat exchanger. The first vent gas, after being cooled to a heavy hydrocarbon separation temperature, enters into at least one first gas-liquid separator in which heavy hydrocarbon is separated.

According to the aforesaid process for recovering valuables from vent gas in polyolefin production, the first multi-stream heat exchanger is a plate-fin heat exchanger, a coil-wound heat exchanger, or a combination thereof.

According to the aforesaid process for recovering valuables from vent gas in polyolefin production, in the light hydrocarbon separation step, a second vent gas, which is generated by the heavy hydrocarbon separation step, enters into a second multi-stream heat exchanger. The second vent gas, after being cooled to a light hydrocarbon separation temperature, enters into at least one second gas-liquid separator in which light hydrocarbon is separated.

According to the aforesaid process for recovering valuables from vent gas in polyolefin production, the second multi-stream heat exchanger is a plate-fin heat exchanger, a coil-wound heat exchanger, or a combination thereof.

According to the aforesaid process for recovering valuables from vent gas in polyolefin production, a second generated gas, which is generated by the membrane separation procedure, is returned to an inlet of the compressor of the compression cooling separation step, or to a waste gas buffer tank. In the membrane separation procedure, at least one group of hydrocarbon selective membrane module and/ or at least one group of hydrogen selective membrane module are/is used.

According to the aforesaid process for recovering valuables from vent gas in polyolefin production, in the membrane separation procedure, one group of hydrocarbon selective membrane module and one group of hydrogen selective membrane module are used. The first gas enters into the hydrocarbon selective membrane module and the hydrogen selective membrane module in sequence, or, the first gas enters into the hydrogen selective membrane module and the hydrocarbon selective membrane module in sequence.

According to the aforesaid process for recovering valuables from vent gas in polyolefin production, after the compression cooling separation step, the vent gas first enters into a dryer to remove water, and then enters the heavy hydrocarbon separation step.

According to the present disclosure, the compression cooling separation step, the heavy hydrocarbon separation step, the light hydrocarbon separation step, the $N_2$ purification step, and the turbo expansion step are arranged in sequence to form an optimized separation sequence, whereby the energy consumption of the compressor can be greatly reduced. In addition, an external cooling medium with a temperature lower than an ambient temperature is not needed. The purity and recovery of $N_2$ and hydrocarbons can be improved, which can facilitate reduction of energy consumption of the whole system, the investment, and the material consumption.

The above technical features can be combined in any suitable manner, or substituted by the equivalent technical features, as long as the purpose of the present disclosure can be achieved.

BRIEF DESCRIPTION OF THE DRAWINGS

The drawings described herein are used for illustrating, rather than restricting the present disclosure. The shapes and scales of each of the components in the drawings are only exemplary ones to facilitate understanding of the present disclosure, rather than specific definition on the shapes and scales thereof. Under the teaching of the present disclosure, those skilled in the art can select any shapes and scales of the components to implement the present disclosure.

In the drawings, the same components are represented by the same reference signs, and the size of each component does not represent the actual size of the corresponding component.

DETAILED DESCRIPTION OF THE EMBODIMENTS

The details of the present disclosure can be understood more clearly combining the description on the drawings and the embodiments. However, the specific embodiments disclosed herein are only used for illustrating the present disclosure, while cannot be understood as limiting the present disclosure in any manner. Those skilled in the art can make any deformations under the teaching of the technical content disclosed herein, and all the deformations fall into the scope of the present disclosure. The present disclosure will be further illustrated hereinafter with reference to the drawings.

Figure 1:
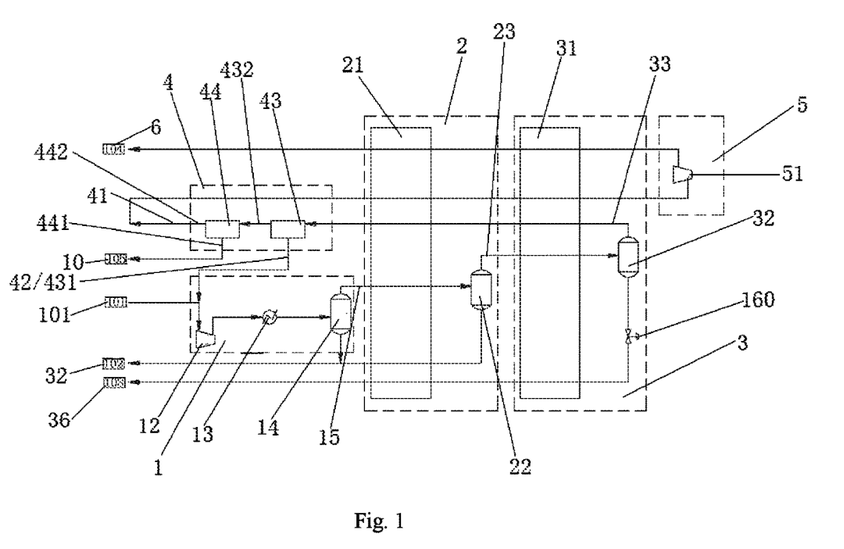
FIG. 1 schematically shows a process (I) for recovering valuables from vent gas in polyolefin production according to the present disclosure.
Figure 2:
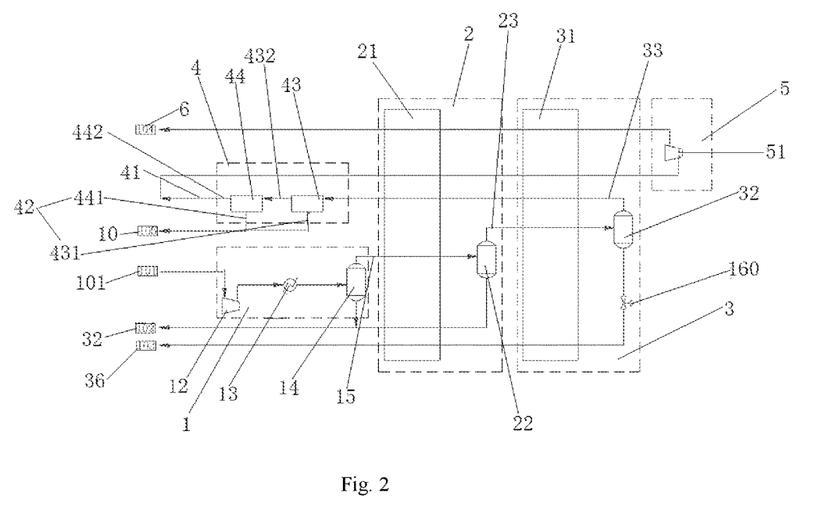
FIG. 2 schematically shows a process (II) for recovering valuables from vent gas in polyolefin production according to the present disclosure.
Figure 3:
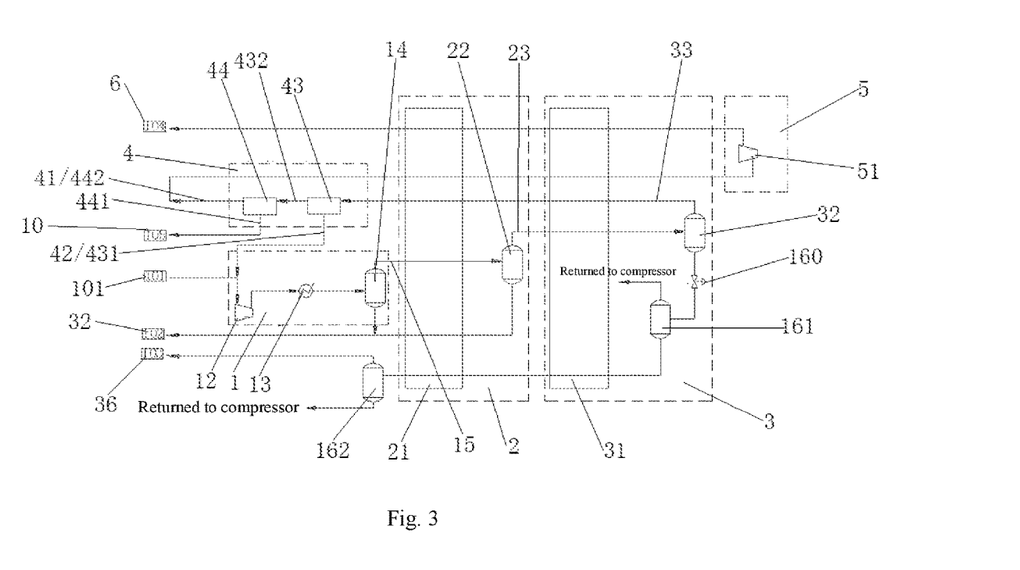
FIG. 3 schematically shows a process (III) for recovering valuables from vent gas in polyolefin production according to the present disclosure.

FIGS. 1 to 3 respectively show a process (I) for recovering valuables from vent gas in polyolefin production, a process (II) for recovering valuables from vent gas in polyolefin production, and a process (III) for recovering valuables from vent gas in polyolefin production.

It should be noted that, in the present disclosure, light hydrocarbon refers to $C_2H_n$ and $C_3H_n$, and heavy hydrocarbon refers to $C_{4+}H_n$. As shown in FIGS. 1 to 3, the process for recovering valuables from vent gas in polyolefin production comprises a compression cooling separation step 1, a heavy hydrocarbon separation step 2, a light hydrocarbon separation step 3, a $N_2$ purification step 4, and a turbo expansion step 5 in sequence. The $N_2$ purification step 4 comprises a membrane separation procedure. The light hydrocarbon separation step 3 comprises at least one gas-liquid separation procedure. A first gas 33, which is obtained by the gas-liquid separation procedure, after temperature rise through heat exchange with multiple streams in the light hydrocarbon separation step 3, enters the heavy hydrocarbon separation step 2 for further temperature rise. The first gas 33, after temperature rise, enters the $N_2$ purification step 4. A first generated gas, which is obtained by the membrane separation procedure of the $N_2$ purification step 4, enters the heavy hydrocarbon separation step 2 and the light hydrocarbon separation step 3 in sequence, and a temperature of the first generated gas decreases after heat exchange with streams in the heavy hydrocarbon separation step and the light hydrocarbon separation step. The first generated gas, after temperature drop, enters the turbo expansion step 5.

Specifically, in the compression cooling separation step 1, a vent gas 101 and a recycle stream enter into a compressor 12 to be compressed (an outlet pressure of the compressor 12 is in a range from 0.8 MPa to 2.5 MPa), and enter into a cooler 13 to be cooled. According to a specific embodiment, a cooling medium of the cooler 13 is cooling water or air.

Further, after the compression cooling separation step 1, the vent gas 101 first enters into a dryer (not shown in FIGS. 1 to 3) to remove water, and then enters the heavy hydrocarbon separation step 2. A drying effect of the dryer should ensure that ice blockage would not occur in the following light hydrocarbon separation step 3. At a low-temperature environment, when the vent gas 101 contains a small amount of water, the ice blockage would possibly occur. Since the dryer is provided, the ice blockage can be prevented.

Further, according to the present disclosure, the vent gas coming from the cooler 13 first passes through a waste gas buffer tank 14 and then enters the heavy hydrocarbon separation step 2. In this manner, it can be ensured that the gas is transmitted to the heavy hydrocarbon separation step 2 stably. Of course, an outlet of the waste gas buffer tank 14 can be connected to a heavy hydrocarbon recovery device 32 so as to recover heavy hydrocarbon initially. According to one specific embodiment, a dryer (not shown in FIGS. 1 to 3) is provided between the cooler 13 and the waste gas buffer tank 14. A drying effect of the dryer should ensure that ice blockage would not occur in the following light hydrocarbon separation step 3. At a low-temperature environment, when the vent gas 101 contains a small amount of water, the ice blockage would possibly occur. Since the dryer is provided, the ice blockage can be prevented.

The vent gas 101 can be compressed by the compressor 12 to a certain pressure (for example 0.8 MPa to 2.5 MPa). Then, the vent gas 101 can be cooled by cooling water or air to a temperature (for example 40° C.) slightly higher than an ambient temperature. If the vent gas 101 contains a small amount of water, a dryer can be provided to remove the water so as to prevent the ice blockage.

Specifically, in the heavy hydrocarbon separation step 2, a first vent gas 15, which is generated by the compression cooling separation step 1, enters into a first multi-stream heat exchanger 21. The first vent gas 15, after a temperature thereof is decreased to a heavy hydrocarbon separation temperature, enters into at least one first gas-liquid separator 22 in which heavy hydrocarbon is separated. A second vent gas 23 generated from a top of the first gas-liquid separator 22 enters the light hydrocarbon separation step 3, and heavy hydrocarbon separated from a bottom of the first gas-liquid separator 22, after being heated by the first multi-stream heat exchanger 21, enters into the heavy hydrocarbon recovery device 32 to recover heavy hydrocarbon.

Further, the first multi-stream heat exchanger 21 is a plate-fin heat exchanger, a coil-wound heat exchanger, or a combination thereof. Of course, the first multi-stream heat exchanger 21 can be substituted by a plurality of common heat exchangers.

A stream (i.e., a first vent gas 15) coming from the compression cooling separation step 1 enters into the first multi-stream heat exchanger 21. Heavy hydrocarbon is separated by the first gas-liquid separator 22 taking advantage of an external refrigerant provided in the following turbo expansion step 5. A liquid-phase stream, after throttling flash evaporation, is returned to the first multi-stream heat exchanger 21 to be heated. A separation temperature depends on a partial pressure, a boiling point, and a recovery of heavy hydrocarbon, and a recommended separation temperature is in a range from −20° C. to −70° C. Since heavy hydrocarbon is separated in this step, the ice blockage of heavy hydrocarbon in the following light hydrocarbon separation step can be alleviated.

Specifically, in the light hydrocarbon separation step 3, a second vent gas 23, which is generated by the heavy hydrocarbon separation step 2, enters into a second multi-stream heat exchanger 31. The second vent gas 23, after a temperature thereof is decreased to a light hydrocarbon separation temperature, enters into at least one second gas-liquid separator 32 in which light hydrocarbon is separated.

Further, the second multi-stream heat exchanger 31 is a plate-fin heat exchanger, a coil-wound heat exchanger, or a combination thereof. Of course, the second multi-stream heat exchanger 31 can be substituted by a plurality of common heat exchangers.

A stream (i.e., a second vent gas 23) coming from a top of the first gas-liquid separator 22 enters into the second multi-stream heat exchanger 31. Light hydrocarbon is separated by the second gas-liquid separator 32 taking advantage of an external refrigerant provided in the following turbo expansion step 5. A liquid-phase stream that is separated from a bottom of the second gas-liquid separator 32, after throttling flash evaporation, is returned to the second multi-stream heat exchanger 31 and the first multi-stream heat exchanger 21 in sequence to be heated, and enters into a light hydrocarbon recovery device 36 to recover light hydrocarbon. A gas 33 (i.e., a first gas 33) coming from a top of the second gas-liquid separator 32, is returned to the second multi-stream heat exchanger 31 and the first multi-stream heat exchanger 21 in sequence to be heated. That is, the first gas 33, which is obtained by the gas-liquid separation procedure, after temperature rise through heat exchange with multiple streams in the light hydrocarbon separation step 3, enters the heavy hydrocarbon separation step 2 for further temperature rise. The first gas 33, after temperature rise, enters the $N_2$ purification step 4. A separation temperature of the second gas-liquid separator 32 depends on a partial pressure, a boiling point, and a recovery of light hydrocarbon, and a recommended separation temperature is in a range from −90° C. to −140° C.

Further, as shown in FIG. 3, a liquid-phase stream separated from the second gas-liquid separator 32 enters into a third gas-liquid separator 161, a fourth gas-liquid separator 162, and the light hydrocarbon recovery device 36 in sequence. A gas coming from a top of the third gas-liquid separator 161 is returned to the compressor 12, and a liquid-phase stream separated from the third gas-liquid separator 161 enters into the second multi-stream heat exchanger 31, the first multi-stream heat exchanger 21, and the fourth gas-liquid separator 162 in sequence. A gas coming from a top of the fourth gas-liquid separator 162 enters into the light hydrocarbon recovery device 36, and a liquid-phase stream separated from the fourth gas-liquid separator 162 is returned to the compressor 12. In this manner, the purity of the recovered light hydrocarbon can be further improved.

Specifically, according to the present disclosure, a first generated gas 41 (which can be also called as residual gas 41), which is obtained by the membrane separation procedure of the $N_2$ purification step 4, enters into the first multi-stream heat exchanger 21 and the second multi-stream heat exchanger 31 in sequence, so that a temperature of the first generated gas 41 decreases after heat exchange with streams in the heavy hydrocarbon separation step 2 and the light hydrocarbon separation step 3. The first generated gas 41, after temperature drop, enters the turbo expansion step 5. A second generated gas 42, which is generated by the membrane separation procedure of the $N_2$ purification step 4, is returned to the compressor 12 of the compression cooling separation step 1, so that gas can be fully recovered and reused. According to the present disclosure, the membrane separation procedure comprises at least one group of hydrocarbon selective membrane module 43 and/or at least one group of hydrogen selective membrane module 44.

According to one specific embodiment, the membrane separation procedure comprises one group of hydrocarbon selective membrane module 43 and one group of hydrogen selective membrane module 44. The first gas 33 enters into the hydrocarbon selective membrane module 43 and the hydrogen selective membrane module 44 in sequence, or, the first gas 33 can also enter into the hydrogen selective membrane module 44 and the hydrocarbon selective membrane module 43 in sequence. That is, a sequence of the hydrocarbon selective membrane module 43 and the hydrogen selective membrane module 44 can be adjusted. The hydrocarbon selective membrane module 43 can be arranged as a first one, or the hydrogen selective membrane module 44 can be arranged as a first one, which is not defined here.

The hydrocarbon selective membrane module 43 comprises a hydrocarbon selective membrane. According to the present disclosure, the hydrocarbon selective membrane is one kind of membrane which is more permeable to hydrocarbon components than to $H_2$, $N_2$ and other components. A rubber polymer membrane can be selected, such as an organic siloxane polymer membrane, through which the permeation rate of hydrocarbon components is higher than that of $H_2$, $N_2$ and other gases. The hydrogen selective membrane module 44 comprises a hydrogen selective membrane. According to the present disclosure, the hydrogen selective membrane is one kind of membrane which is more permeable to $H_2$ than to $N_2$ and hydrocarbon components. A glass polymer membrane can be selected, such as polyimide membrane, polyaramide membrane, and polysulfone membrane, through which the permeation rate of $H_2$ is higher than that of $N_2$, hydrocarbon and other gases. The hydrocarbon selective membrane module 43 and the hydrogen selective membrane module 44 can be any one selected from a group consisting of a spiral-wound membrane module, a plate-frame membrane module, and a hollow fiber membrane module.

According to one specific embodiment, a permeate gas 441 of the hydrogen selective membrane module 44 is connected to a waste gas buffer tank 10. A permeate gas 431 of the hydrocarbon selective membrane module 43 can be connected to the waste gas buffer tank 10 (as shown in FIG. 2), or connected to an inlet of the compressor 12 (as shown in FIG. 1 or FIG. 3). When the permeate gas 431 is connected to the waste gas buffer tank 10, energy consumption of the compressor 12 can be reduced, while hydrocarbon loss will be increased to some extent. When the permeate gas 431 is connected to the inlet of the compressor 12, the hydrocarbon loss will be reduced, while the energy consumption of the compressor 12 will be increased. If the permeate gas 431 contains a high amount of hydrocarbon, the permeate gas 431 can be connected to the compressor 12. If the permeate gas 431 contains a low amount of hydrocarbon, the permeate gas 431 can be connected to the waste gas buffer tank 10. That is, the permeate gas 431 can be connected to the waste gas buffer tank 10 or the compressor 12 according to actual needs.

A residual gas 432 of the hydrocarbon selective membrane module 43 enters into the hydrogen selective membrane module 44, and a residual gas 442 of the hydrogen selective membrane module 44 is the first generated gas 41 obtained by the membrane separation procedure of the $N_2$ purification step 4.

The first gas 33, after being heated again, enters a hydrocarbon selective membrane separation procedure. After hydrocarbon selective membrane separation procedure, the permeate gas 431 (which mainly contains hydrocarbons) is returned to the inlet of the compressor 12, and the residual gas 432 enters a hydrogen selective membrane separation procedure. After the hydrogen selective membrane separation procedure, the permeate gas 441 is return to the waste gas buffer tank 10, and the residual gas 442 (which is mainly $N_2$ with a high purity) enters the heavy hydrocarbon separation step 2 and the light hydrocarbon separation step 1 in sequence to be cooled. Specifically, according to the present disclosure, the residual gas 442 enters into the first multi-stream heat exchanger 21 and the second multi-stream heat exchanger 31 in sequence to be cooled. If the residual gas after the hydrocarbon selective membrane separation procedure enters the hydrogen selective membrane separation procedure, the permeate gas of the hydrogen selective membrane should be discharged outside the system due to $H_2$ accumulation. That is, the permeate gas 441 is returned to the waste gas buffer tank 10.

The first generated gas 41 is returned to the heavy hydrocarbon separation step 2 and the light hydrocarbon separation step 3 to be cooled, and enters into a turbine expander 51 of a following turbo expansion step 5 to be expanded. The expanded gas is returned to the light hydrocarbon separation step 3 and the heavy hydrocarbon separation step 2 to serve as a low-temperature external refrigerant, so that a cold energy of the gas can be fully utilized, which can facilitate the reduction of energy consumption. Then, the gas enters into a $N_2$ recovery device 6.

Further, according to the present disclosure, at least one of the compression cooling separation step 1, the heavy hydrocarbon separation step 2, the light hydrocarbon separation step 3, the $N_2$ purification step 4, and the turbo expansion step 5 is cooled by an external cooling medium. A temperature of the external cooling medium is higher than or equal to an ambient temperature, which can facilitate the reduction of energy consumption.

According to one specific embodiment, only the compression cooling separation step 1 is cooled by an external cooling medium, while other steps are not cooled by an external cooling medium.

Of course, according to the present disclosure, it can be arranged that the compression cooling separation step 1, the heavy hydrocarbon separation step 2, the light hydrocarbon separation step 3, the $N_2$ purification step 4, and the turbo expansion step 5 each are not cooled by an external cooling medium.

According to the present disclosure, the low-temperature cold energy in the heavy hydrocarbon separation step 2 and the light hydrocarbon separation step 3 completely comes from an expansion cold energy in the turbo expansion step 5, and an external cooling medium with a temperature no lower than an ambient temperature (i.e., the temperature of the external cooling medium is higher than or equal to the ambient temperature) is used only in the compression cooling separation step 1. By contrast, as to other methods, an external low-temperature cooling medium should be used to obtain same purity and recovery of hydrocarbon and $N_2$.

According to the present disclosure, a hydrocarbon separation process comprises the heavy hydrocarbon separation step 2 and the light hydrocarbon separation step 3 to achieve following purposes: first, to separate heavy hydrocarbon from light hydrocarbon; and second, to prevent ice blockage of heavy hydrocarbon in the light hydrocarbon separation step 3.

It should be noted that, if the vent gas contains a small amount of heavy hydrocarbon, the ice blockage of heavy hydrocarbon would not occur in the light hydrocarbon separation step 3, and it is unnecessary to separate heavy hydrocarbon from light hydrocarbon, the heavy hydrocarbon separation step 2 can be omitted. That is, according to the present disclosure, the heavy hydrocarbon separation step 2 can be omitted, and thus the light hydrocarbon separation step 3 can be called as a hydrocarbon separation step.

It should be further noted that, as shown in FIG. 2, the permeate gas 431 of the hydrocarbon selective membrane is directly discharged outside the system, and is not returned to the compressor 12. In this manner, the energy consumption of the compressor 12 can be reduced, while the hydrocarbon loss will be increased. As shown in FIG. 3, a liquid-phase stream coming from a bottom of the second gas-liquid separator 32 is throttled by a throttle valve 160, and enters the third gas-liquid separator 161 (which can also be called as a flash evaporation tank) to separate gas from liquid. The gas is returned to the compressor 12. The liquid enters into the second multi-stream heat exchanger 31 and the first multi-stream heat exchanger 21 in sequence to be heated, and then enters into the fourth gas-liquid separator 162 for further gas-liquid separation. A gas coming from a top of the fourth gas-liquid separator 162 enters into the light hydrocarbon recovery device 36, and a liquid separated by the fourth gas-liquid separator 162 is returned to the compressor 12. In this manner, the purity of the recovered light hydrocarbon can be further improved.

According to the present disclosure, a recovery stream refers to a stream that is returned to the compressor 12 from the heavy hydrocarbon separation step 2, the light hydrocarbon separation step 3, and the $N_2$ purification step 4.

As shown in FIGS. 1 to 3, in the first multi-stream heat exchanger 21 and the second multi-stream heat exchanger 31, a stream from a left side to a right side is a temperature drop procedure, while a stream from the right side to the left side is a temperature rise procedure. According to the present disclosure, a gas-phase outlet of a gas-liquid separator is provided at a top of the tank, and a liquid-phase outlet of the gas-liquid separator is provided at a bottom of the tank.

The process for recovering valuables from vent gas in polyolefin production provided herein is used in an actual system, and the system is compared with a traditional system.

EXAMPLE 1

A vent gas of a high-pressure condenser in a polyethylene plant of a petrochemical enterprise has a temperature of −10° C., and a pressure of 1.2 MPa. Since the vent gas has a certain pressure, no compressor is provided. The method as shown in FIG. 3 is used. In order to highlight an importance of separation sequence, comparative example 1 adopts the method of CN201310444283, and the method comprises a compression cooling separation step, a hydrogen selective membrane separation step, a heavy hydrocarbon separation step, and a light hydrocarbon separation step. The results of example 1 and comparative example 1 are shown in Table 1.

Comparing the results of example 1 and comparative example 1, and the comparative results are shown in Table 2.

TABLE 1

Results of example 1 and comparative example 1

| | Vent gas | High-pressure condensate | Cryogenic gas | Recovered light hydrocarbon | Recovered heavy hydrocarbon | Recovered $N_2$ | Waste gas |
|---|---|---|---|---|---|---|---|
| | Comparative example 1 | | | | | | |
| Mass Flow (kg/hr) | | | | | | | |
| $H_2$ | 7.012 | 0.021 | 6.991 | 0.002 | 0.001 | 2.867 | 4.122 |
| Methane | 8.416 | 0.194 | 8.222 | 0.184 | 0.043 | 7.055 | 0.939 |
| $N_2$ | 1845.028 | 9.331 | 1835.697 | 4.620 | 1.359 | 1649.967 | 179.750 |
| Ethylene | 325.583 | 33.699 | 291.884 | 82.696 | 13.115 | 172.527 | 23.545 |
| Ethane | 77.048 | 11.937 | 65.111 | 27.717 | 5.232 | 27.300 | 4.863 |
| Isopentane | 1446.013 | 1322.013 | 124.000 | 5.151 | 116.995 | 0.004 | 1.850 |
| Mass Frac (%) | | | | | | | |
| $H_2$ | 0.19 | 0.00 | 0.30 | 0.00 | 0.00 | 0.15 | 1.92 |
| Methane | 0.23 | 0.01 | 0.35 | 0.15 | 0.03 | 0.38 | 0.44 |
| $N_2$ | 49.74 | 0.68 | 78.72 | 3.84 | 0.99 | 88.72 | 83.58 |
| Ethylene | 8.78 | 2.45 | 12.52 | 68.70 | 9.59 | 9.28 | 10.95 |
| Ethane | 2.08 | 0.87 | 2.79 | 23.03 | 3.83 | 1.47 | 2.26 |
| Isopentane | 38.99 | 95.99 | 5.32 | 4.28 | 85.56 | 0.00 | 0.86 |
| Molar flow (kmol/hr) | 104.07 | 20.28 | 83.80 | 4.12 | 2.31 | 67.82 | 9.55 |
| Mass flow (kg/hr) | 3709.10 | 1377.20 | 2331.91 | 120.37 | 136.74 | 1859.72 | 215.07 |
| Temperature (° C.) | 42 | −10 | −10 | −41.9 | −60 | −41.9 | −10 |
| Pressure (bar) | 1.16 | 13 | 13 | 1.5 | 13 | 1.5 | 1.5 |
| | Example 1 | | | | | | |
| Mass Flow (kg/hr) | | | | | | | |
| $H_2$ | 7.012 | 0.024 | 9.724 | 0.000 | 0.003 | 2.859 | 4.126 |
| Methane | 8.416 | 0.292 | 15.072 | 0.935 | 0.078 | 6.350 | 0.760 |
| $N_2$ | 1845.028 | 9.097 | 2183.067 | 1.701 | 1.547 | 1665.071 | 167.612 |
| Ethylene | 325.583 | 32.522 | 343.217 | 252.305 | 14.692 | 24.105 | 1.959 |
| Ethane | 77.048 | 10.720 | 71.237 | 58.170 | 5.450 | 2.520 | 0.188 |
| Isopentane | 1446.013 | 1302.558 | 148.651 | 1.910 | 141.545 | 0.000 | 0.000 |
| Mass Frac (%) | | | | | | | |
| $H_2$ | 0.19 | 0.00 | 0.35 | 0.00 | 0.00 | 0.17 | 2.36 |
| Methane | 0.23 | 0.02 | 0.54 | 0.30 | 0.05 | 0.37 | 0.44 |
| $N_2$ | 49.74 | 0.67 | 78.78 | 0.54 | 0.95 | 97.89 | 95.97 |
| Ethylene | 8.78 | 2.40 | 12.39 | 80.09 | 9.00 | 1.42 | 1.12 |
| Ethane | 2.08 | 0.79 | 2.57 | 18.47 | 3.34 | 0.15 | 0.11 |
| Isopentane | 38.99 | 96.11 | 5.36 | 0.61 | 86.67 | 0.00 | 0.00 |
| Molar flow (kmol/hr) | 104.07 | 19.92 | 100.36 | 11.07 | 2.73 | 62.20 | 8.15 |
| Mass flow (kg/hr) | 3709.10 | 1355.21 | 2770.97 | 315.02 | 163.31 | 1700.91 | 174.65 |

TABLE 1-continued

Results of example 1 and comparative example 1

|  | Vent gas | High-pressure condensate | Cryogenic gas | Recovered light hydrocarbon | Recovered heavy hydrocarbon | Recovered $N_2$ | Waste gas |
|---|---|---|---|---|---|---|---|
| Temperature (° C.) | 42 | −10 | −10 | −12.4 | −60 | −12.4 | −15 |
| Pressure (bar) | 1.16 | 13 | 13 | 1.5 | 13 | 2 | 1.5 |

TABLE 2

Comparative results

|  | Light hydrocarbon purity (%) | Hydrocarbon recovery (%) | $N_2$ purity (%) | $N_2$ recovery (%) | Mass flow of waste gas (kg/h) |
|---|---|---|---|---|---|
| Comparative example 1 | 91.73 | 98.36 | 88.72 | 90.26 | 215.07 |
| Example 1 | 98.56 | 99.88 | 97.89 | 90.91 | 174.65 |

According to the present example, the vent gas of polyethylene plant is recovered. It can be seen from Table 2 that, under a condition that no energy consumption is increased, all performances in example 1 are better than those in comparative example 1. In particular, the $N_2$ purity and light hydrocarbon purity in example 1 are much higher than those in comparative example 1. Therefore, it is shown that different separation sequence will bring about absolutely different separation effect.

EXAMPLE 2

A vent gas from a polypropylene plant of an enterprise has a temperature of 42° C., and a pressure of 1.16 barA before entering into the compressor. The method as shown in FIG. 3 is used. Comparative example 2 adopts the method of CN201310444283, and the method comprises a compression cooling separation step, a hydrogen selective membrane separation step, a heavy hydrocarbon separation step, and a light hydrocarbon separation step. According to the method of comparative example 2, a much lower temperature should be used to obtain a high purity $N_2$. The method of comparative example 2 is not cost-effective in terms of investment, energy consumption, hydrocarbon purity, and $N_2$ recovery. Here, on the premise that the energy consumption of a compressor in example 2 is the same as that in comparative example 2, other performances are compared. Results of comparative example 2 are shown in Table 3, and results of example 2 are shown in Table 4.

Comparing the results in Table 3 and Table 4, and the comparative results are shown in Table 5.

TABLE 3

Results of comparative example 2

| | Comparative example 2 | | | | |
|---|---|---|---|---|---|
| | Vent gas | Recovered light hydrocarbon | Recovered heavy hydrocarbon | Recovered $N_2$ | Waste gas |
| Mass flow (kg/hr) | | | | | |
| $H_2$ | 1.523 | 0.000 | 0.000 | 0.517 | 1.006 |
| Propane | 413.96 | 365.12 | 28.09 | 1.606 | 19.141 |
| Propene | 22.934 | 19.985 | 1.823 | 0.066 | 1.060 |
| Ethylene | 171.539 | 132.701 | 1.725 | 21.998 | 15.116 |
| N-hexane | 24.231 | 1.986 | 21.856 | 0.000 | 0.389 |
| $N_2$ | 2316.688 | 1.769 | 0.687 | 2066.247 | 247.985 |
| Mass Frac (%) | | | | | |
| $H_2$ | 0.05 | 0.00 | 0.00 | 0.02 | 0.35 |
| Propane | 14.03 | 70.01 | 51.84 | 0.08 | 6.72 |
| Propene | 0.78 | 3.83 | 3.36 | 0.00 | 0.37 |
| Ethylene | 5.81 | 25.44 | 3.18 | 1.05 | 5.31 |
| N-hexane | 0.82 | 0.38 | 40.34 | 0.00 | 0.14 |
| $N_2$ | 78.51 | 0.34 | 1.27 | 98.84 | 87.10 |
| Molar flow (kmol/hr) | 100.21 | 13.95 | 1.05 | 74.84 | 10.37 |
| Mass flow (kg/hr) | 2950.87 | 521.56 | 54.18 | 2090.43 | 284.70 |
| Temperature (° C.) | 42 | 14.52 | −30 | 14.52 | 40.00 |
| Pressure (bar) | 1.16 | 1.5 | 18 | 2.8 | 1.5 |

TABLE 4

Results of example 2

| | Vent gas | Recovered light hydrocarbon | Recovered heavy hydrocarbon | Recovered $N_2$ | Waste gas |
|---|---|---|---|---|---|
| Mass flow (kg/hr) | | | | | |
| $H_2$ | 1.523 | 0.000 | 0.000 | 0.515 | 1.007 |
| Propane | 413.95 | 396.68 | 16.70 | 0.546 | 0.025 |
| Propene | 22.934 | 21.813 | 1.100 | 0.021 | 0.001 |
| Ethylene | 171.54 | 160.21 | 1.151 | 9.346 | 0.833 |
| N-hexane | 24.231 | 1.398 | 22.833 | 0.000 | 0.000 |
| $N_2$ | 2316.688 | 2.008 | 0.472 | 2083.550 | 230.658 |
| Mass Frac (%) | | | | | |
| $H_2$ | 0.05 | 0.00 | 0.00 | 0.02 | 0.43 |
| Propane | 14.03 | 68.15 | 39.52 | 0.03 | 0.01 |
| Propene | 0.78 | 3.75 | 2.60 | 0.00 | 0.00 |
| Ethylene | 5.81 | 27.52 | 2.72 | 0.45 | 0.36 |
| N-hexane | 0.82 | 0.24 | 54.03 | 0.00 | 0.00 |
| $N_2$ | 78.51 | 0.34 | 1.12 | 99.50 | 99.20 |
| Molar flow (kmol/hr) | 100.21 | 15.72 | 0.74 | 74.98 | 8.76 |
| Mass flow (kg/hr) | 2950.87 | 582.11 | 42.26 | 2093.98 | 232.52 |
| Temperature (° C.) | 42 | 20.53 | -30 | 20.53 | 20.53 |
| Pressure (bar) | 1.16 | 1.5 | 18 | 2.8 | 1.5 |

TABLE 5

Comparative results

| | Light hydrocarbon purity (wt %) | Hydrocarbon recovery (wt %) | $N_2$ purity (wt %) | $N_2$ recovery (wt %) | Mass flow of waste gas (kg/h) |
|---|---|---|---|---|---|
| Comparative example 2 | 99.28 | 94.37 | 98.84 | 89.3 | 248 |
| Example 2 | 99.41 | 99.86 | 99.5 | 90 | 230 |

Under a condition that the compressors have a same energy consumption, all performances in example 2 are better than those in comparative example 2. In particular, the hydrocarbon recovery and the $N_2$ purity are greatly improved.

EXAMPLE 3

A vent gas from a polypropylene plant of an enterprise has a temperature of 40° C., and a pressure of 1.2 barA before entering into the compressor. Comparative example 3 adopts the method of U.S. Pat. No. 5,769,927. In order to facilitate comparison, a hydrogen selective membrane separation step is added to the method of U.S. Pat. No. 5,769,927, and the method comprises a compression cooling separation step, a hydrocarbon selective membrane separation step, and the hydrogen selective membrane separation step. In example 3 and comparative example 3, the obtaining of $N_2$ with a purity of 99.5% is taken as a comparison condition. Results of comparative example 3 and example 3 are shown in Table 6.

TABLE 6

Results of comparative example 3 and example 3

| | Comparative example 3 | | | | Example 3 | | | | |
|---|---|---|---|---|---|---|---|---|---|
| | Vent gas | Recovered hydrocarbon | Recovered $N_2$ | Waste gas | Vent gas | Recovered light hydrocarbon | Recovered heavy hydrocarbon | Recovered $N_2$ | Waste gas |
| Mass flow (kg/hr) | | | | | | | | | |
| $H_2$ | 1.729 | 0.009 | 0.233 | 1.486 | 1.729 | 0.000 | 0.000 | 0.834 | 0.895 |
| Propene | 636.428 | 625.768 | 9.810 | 0.846 | 636.428 | 610.992 | 14.912 | 10.042 | 0.483 |
| Propane | 15.452 | 15.284 | 0.155 | 0.013 | 15.452 | 14.822 | 0.433 | 0.187 | 0.009 |
| N-hexane | 34.079 | 34.079 | 0.000 | 0.000 | 34.079 | 4.140 | 29.939 | 0.000 | 0.000 |
| $N_2$ | 2599.60 | 11.71 | 2125.706 | 462.19 | 2599.6 | 1.426 | 0.272 | 2331.80 | 266.103 |
| Mass Frac (%) | | | | | | | | | |
| $H_2$ | 0.05 | 0.00 | 0.01 | 0.32 | 0.05 | 0.00 | 0.00 | 0.04 | 0.33 |
| Propene | 19.36 | 91.11 | 0.46 | 0.18 | 19.36 | 96.77 | 32.73 | 0.44 | 0.18 |
| Propane | 0.47 | 2.23 | 0.01 | 0.00 | 0.47 | 2.35 | 0.95 | 0.01 | 0.00 |
| N-hexane | 1.04 | 4.96 | 0.00 | 0.00 | 1.04 | 0.66 | 65.72 | 0.00 | 0.00 |
| $N_2$ | 79.08 | 1.70 | 99.52 | 99.50 | 79.08 | 0.23 | 0.60 | 99.52 | 99.48 |
| Molar flow (kmol/hr) | 10952.6 | 1603.5 | 7623.4 | 1725.7 | 10952.6 | 1495.5 | 72.1 | 8389.5 | 995.5 |
| Mass flow (kg/hr) | 3287.3 | 686.8 | 2135.9 | 464.5 | 3287.3 | 631.4 | 45.6 | 2342.9 | 267.5 |

TABLE 6-continued

Results of comparative example 3 and example 3

| | Comparative example 3 | | | | Example 3 | | | | |
|---|---|---|---|---|---|---|---|---|---|
| | Vent gas | Recovered hydrocarbon | Recovered $N_2$ | Waste gas | Vent gas | Recovered light hydrocarbon | Recovered heavy hydrocarbon | Recovered $N_2$ | Waste gas |
| Temperature (° C.) | 40 | −30 | −30 | −30 | 40 | 38 | −26 | 38 | 0.00E+00 |
| Pressure (bar) | 1.2 | 18 | 18 | 1.5 | 1.2 | 1.5 | 11 | 1.5 | 1.5 |

TABLE 7

Comparative results of energy consumption

| | Compressor energy consumption (kw) | Condenser energy consumption (kw) | Remark |
|---|---|---|---|
| Comparative example 3 | 1754 | 1930 | The condenser needs to be cooled to −30° C. by a refrigeration system |
| Example 3 | 900 | 901 | The condenser is cooled to 40° C. only by cooling water |

It can be seen from Table 7 that, to obtain $N_2$ with a purity of 99.5%, a stream at an inlet of the compressor and a pressure at an outlet thereof in comparative example 3 (which comprises the compression cooling separation step, the hydrocarbon selective membrane separation step, and the hydrogen selective membrane separation step) are higher than those in example 3, and thus the energy consumption of the compressor in comparative example 3 is much higher than that in example 3. Moreover, in comparative example 3, the vent gas needs to be cooled to −30° C. by an additional external refrigerant, and then hydrocarbon can be recovered. Compared with the cooling water in example 3, energy consumption is further increased. In addition, according to comparative example 3, heavy hydrocarbon and light hydrocarbon are not separated.

It can be seen from the above three examples that, in the process provided herein, the energy consumption of the compressor can be greatly reduced. In addition, an external cooling medium with a temperature lower than an ambient temperature is not needed. The purity and recovery of $N_2$ and hydrocarbons can be improved, which can facilitate reduction of energy consumption of the whole system, the investment, and the material consumption.

According to the present disclosure, the low-temperature cold energy in the heavy hydrocarbon separation step 2 and the light hydrocarbon separation step 3 completely comes from an expansion cold energy in the turbo expansion step 5, and an external cooling medium with a temperature no lower than the ambient temperature is used only in the compression cooling separation step 1. By contrast, as to other methods, an external low-temperature cooling medium should be used to obtain same purity and recovery of hydrocarbon and $N_2$. According to the present disclosure, a hydrocarbon separation process comprises the heavy hydrocarbon separation step and the light hydrocarbon separation step to achieve following purposes: first, to separate heavy hydrocarbon from light hydrocarbon; and second, to prevent ice blockage of heavy hydrocarbon in the light hydrocarbon separation step.

According to the present disclosure, the compression cooling separation step, the heavy hydrocarbon separation step, the light hydrocarbon separation step, the $N_2$ purification step, and the turbo expansion step are arranged in sequence to form an optimized separation sequence, whereby the energy consumption of the compressor can be greatly reduced. In addition, an external cooling medium with a temperature lower than an ambient temperature is not needed. The purity and recovery of $N_2$ and hydrocarbons can be improved, which can facilitate reduction of energy consumption of the whole system, the investment, and the material consumption.

The present disclosure is illustrated in detail in combination with preferred embodiments hereinabove, but it can be understood that the embodiments disclosed herein can be improved or substituted without departing from the protection scope of the present disclosure. In particular, as long as there are no structural conflicts, the technical features disclosed in each and every embodiment of the present disclosure can be combined with one another in any way, and the combined features formed thereby are within the protection scope of the present disclosure. The present disclosure is not limited by the specific embodiments disclosed herein, but includes all technical solutions falling into the protection scope of the claims.

The invention claimed is:

1. A process for recovering valuables from vent gas in polyolefin production, comprising a compression cooling separation step, a heavy hydrocarbon separation step, a light hydrocarbon separation step, a $N_2$ purification step, and a turbo expansion step in sequence, wherein the $N_2$ purification step comprises a membrane separation procedure; and wherein the light hydrocarbon separation step comprises at least one gas-liquid separation procedure;

wherein a first gas, which is obtained by the gas-liquid separation procedure and is heated through heat exchange with multiple streams in the light hydrocarbon separation step, enters the heavy hydrocarbon separation step and is further heated; the heated first gas then enters the $N_2$ purification step; a first generated gas, which is obtained by the membrane separation procedure of the $N_2$ purification step, enters the heavy hydrocarbon separation step and the light hydrocarbon separation step in sequence, and is cooled through heat exchange with multiple streams in the heavy hydrocarbon separation step and the light hydrocarbon separation step; and then the cooled first generated gas enters the turbo expansion step.

2. The process according to claim 1, wherein an external cooling medium is used for cooling in at least one of the compression cooling separation step, the heavy hydrocarbon separation step, the light hydrocarbon separation step, the $N_2$ purification step, and the turbo expansion step, wherein a temperature of the external cooling medium is higher than or equal to an ambient temperature.

3. The process according to claim 1, wherein in the compression cooling separation step, a vent gas and a recycle stream enter into a compressor to be compressed, and enter into a cooler, a cooling medium of which is cooling water or air.

4. The process according to claim 1, wherein in the heavy hydrocarbon separation step, a first vent gas, which is generated by the compression cooling separation step, enters into a first multi-stream heat exchanger; and wherein the first vent gas, after being cooled to a heavy hydrocarbon separation temperature, enters into at least one first gas-liquid separator in which heavy hydrocarbon and a second vent gas are separated.

5. The process according to claim 4, wherein the first multi-stream heat exchanger is a plate-fin heat exchanger, a coil-wound heat exchanger, or a combination thereof.

6. The process according to claim 1, wherein in the light hydrocarbon separation step, a second vent gas, which is generated by the heavy hydrocarbon separation step, enters into a second multi-stream heat exchanger; and wherein the second vent gas, after being cooled to a light hydrocarbon separation temperature, enters into at least one second gas-liquid separator in which light hydrocarbon is separated.

7. The process according to claim 6, wherein the second multi-stream heat exchanger is a plate-fin heat exchanger, a coil-wound heat exchanger, or a combination thereof.

8. The process according to claim 3, wherein a second generated gas, which is generated by the membrane separation procedure, is returned to an inlet of the compressor of the compression cooling separation step, or to a waste gas buffer tank; and wherein in the membrane separation procedure, at least one group of hydrocarbon selective membrane module and/or at least one group of hydrogen selective membrane module are/is used.

9. The process according to claim 8, wherein in the membrane separation procedure, one group of hydrocarbon selective membrane module and one group of hydrogen selective membrane module are used; and wherein the first gas enters into the hydrocarbon selective membrane module and the hydrogen selective membrane module in sequence, or, the first gas enters into the hydrogen selective membrane module and the hydrocarbon selective membrane module in sequence.

10. The process according to claim 1, wherein after the compression cooling separation step, the vent gas first enters into a dryer to remove water, and then enters the heavy hydrocarbon separation step.

* * * * *